United States Patent Office 3,323,225
Patented June 6, 1967

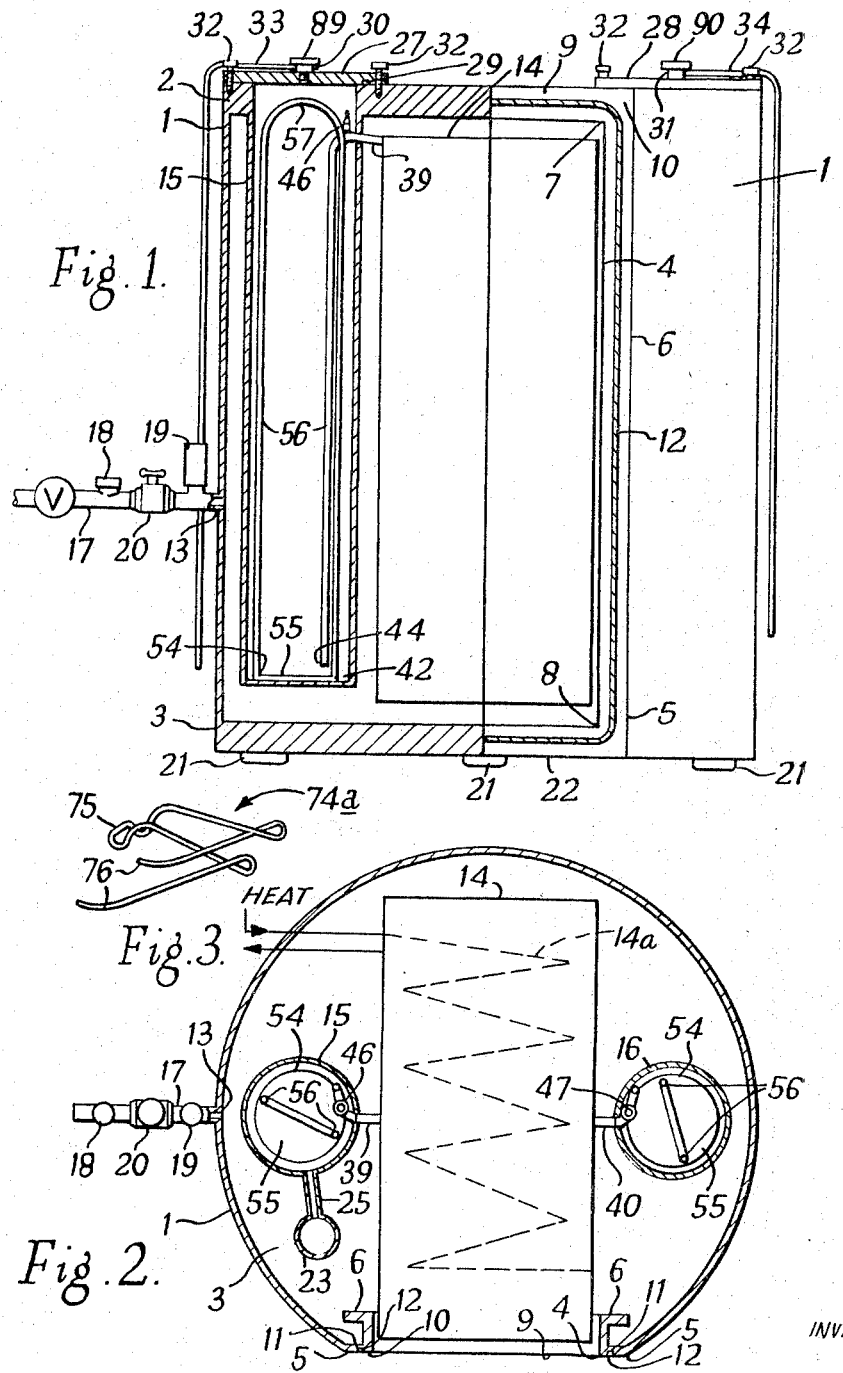

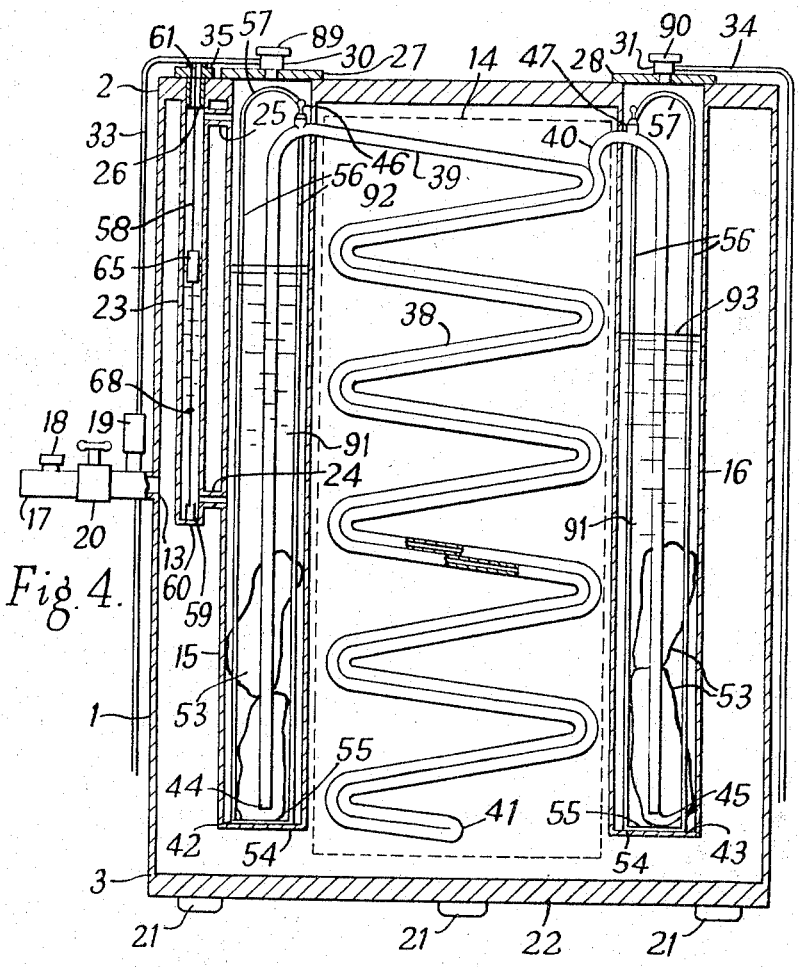
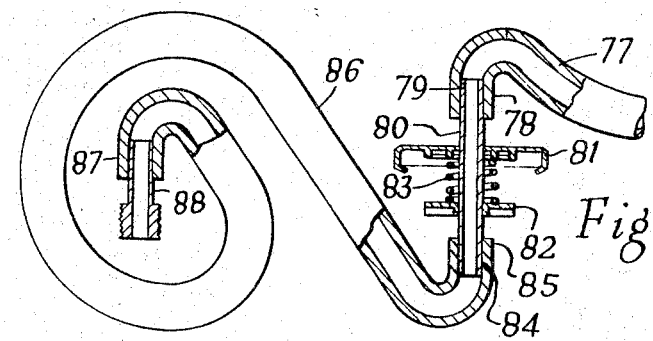

3,323,225
FREEZE-DRYING APPARATUS
Jose Luis Achucarro, 99 Wakehurst Drive,
Southgate, Crawley, England
Filed Oct. 20, 1965, Ser. No. 498,565
Claims priority, application Great Britain, Oct. 29, 1964,
44,072/64
9 Claims. (Cl. 34—92)

The invention relates to a freeze-drying apparatus in which the substance under process is conveniently pre-frozen in situ on a drying assembly in the vacuum chamber by using a fluid refrigerant which subsequently is used to condense the water vapour produced by the sublimitation of the ice in the said frozen substance under subatmospheric pressure.

The substance to be processed can be of any kind suitable for freeze-drying as can such containers as may be necessary for holding it with respect to both their shape and material. There are also no limitations to the shape of the assembly supporting the said substance in its containers, which can be either shelves, racks, cans, drums, canisters or any other suitable assembly.

When some part of any apparatus is kept at a temperature below that of the ambient, however good the thermal insulation of that part may be, there is an unavoidable amount of heat gained from the surroundings. In the preferred embodiment of the present invention this heat gained from the surroundings together with the thermal energy initially stored in the substance to be freeze-dried, containers, assemblies, and other components of the apparatus, through the medium of the gas evolved in the sublimation of solid carbon dioxide immersed in a liquid refrigerant or in the evaporation of some liquid gas used as refrigerant, is made to do work in driving some of the liquid refrigerant through a double cooling coil automatically and with a periodic reversion of flow direction for the purpose of pre-freezing the said substance under process. When the said substance is frozen the flow through the double cooling coil is stopped, leaving the assembly and the substance ready for drying.

Drying of the frozen substance is carried out under sub-atmospheric pressure, and the liquid refrigerant which formerly was used for pre-freezing, is commonly now used in the condenser vessels for condensing the water vapour produced by the drying substance.

An embodiment of the invention will be described by way of example with reference to the accompanying drawings in which:

FIGURE 1 is an elevation view of a cylindrical chamber, the half on the left being in section, and the half on the right being a front view with the door removed;

FIGURE 2 is a sectional plan view of a cylindrical chamber also with the door removed;

FIGURE 3 is a perspective view of a flexible wire support for the valve stem of an automatic valve used in the apparatus;

FIGURE 4 is a schematic, sectional elevation view of the cylindrical chamber;

FIGURE 5 is a sectional elevation view of an empty-ing line device; and

Figure 6:
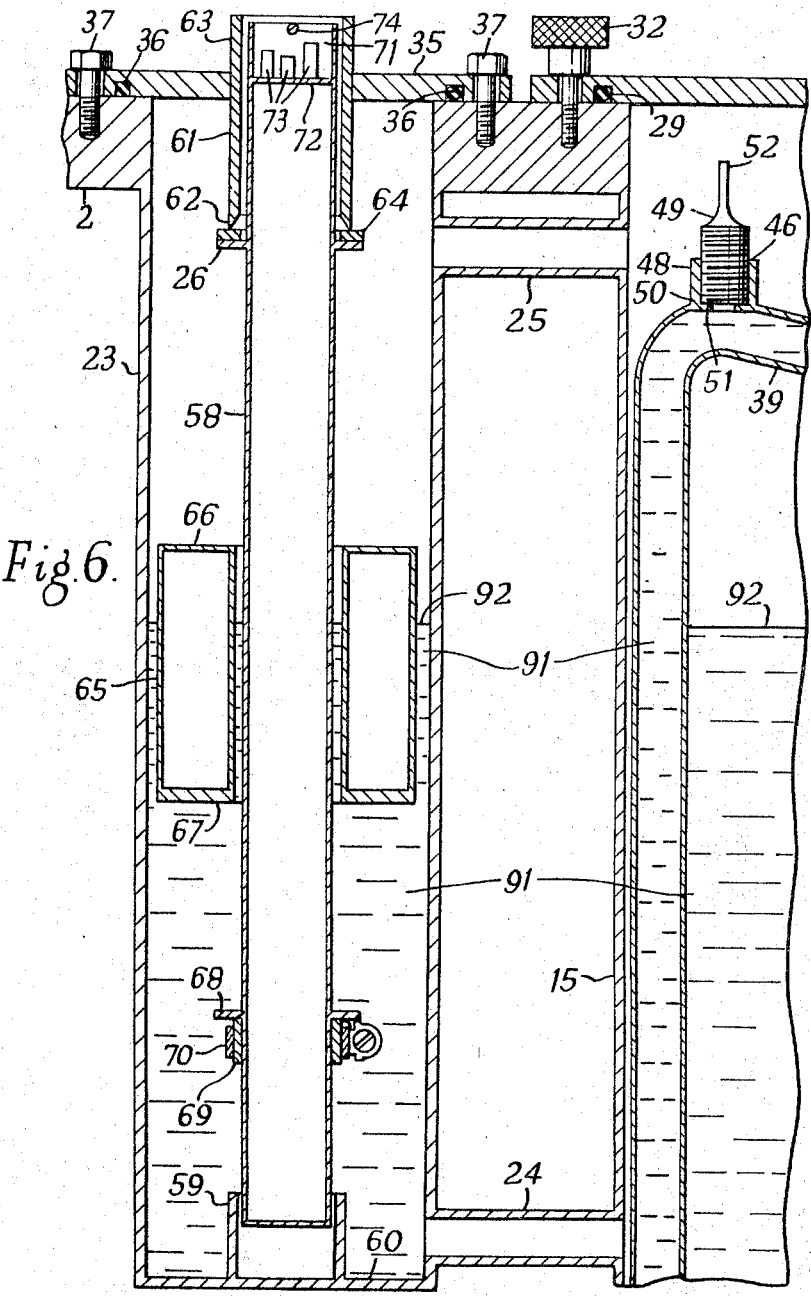
FIGURE 6 is an enlarged, partial, sectional elevation view showing the automatic valve and part of a condenser vessel connected to it.

Referring now to FIGURES 1, 2 and 4, the apparatus comprises a vertical, cylindrical chamber 1 closed at both ends by two flat circular discs 2 and 3.

Access to the interior of the cylindrical chamber 1 for loading and unloading of the substance under process is obtained through a full length rectangular opening 4 formed by the removal of a vertical segment of the cylindrical chamber 1. The vertical edges 5 of the opening 4 are reinforced by two vertical beams 6 of suitable profile and strength, anchored at their top and bottom ends 7 and 8 respectively to the corresponding segmented circular discs 2 and 3. These two vertical beams 6 together with the flat edges 9 obtained by the segmentation of the top and bottom flat discs 2 and 3 at the ends of the said cylindrical chamber 1, form a rectangular frame having a flat vertical front 10. A continuous groove 11 is formed all round the front 10 to receive and retain a vacuum seal gasket 12.

A chamber door, not shown, can be hinged on to the top and bottom ends 2, 3 of the chamber 1 and locked to one of the beams. Alternatively the door may be hinged to one of the reinforcing beams 6 and locked to the other one. The said door can be either flat or may have an external face which follows the cylindrical contour of the chamber 1, but in any case that part of the door which meets the vacuum seal gasket 12 on the flat surface 10 of the frame 4 must be also flat.

A pumping port 13, through which the chamber 1 is evacuated is on the cylindrical wall of the said chamber 1, screened from the drying assembly 14 to be described by one of the condenser vessels 15 in order to protect the vacuum pump, shown schematically from the water vapour contamination.

A pumping line 17 connected to the pumping port 13 has a gas or air inlet valve 18 and a vacuum gauge head 19 on either side of an isolation valve 20 also on the pumping line 17. The positions of the gas or air inlet valve 18 and the vacuum gauge head 19 are interchangeable for convenience.

Legs 21 and/or casters are fixed to the underside 22 of the bottom 3 of the chamber 1.

Projecting into the chamber 1 there are three vertical cylindrical containers 15, 16, 23 with their top ends open to the ambient atmosphere and welded to the edges of corresponding holes bored in the top circular end 2 to receive the said containers 15, 16, 23. Two of these cylindrical containers 15, 16, 23 constitute the condenser vessels 15, 16 which are similar in size and shape and occupy diametrically opposite sides inside the cylindrical chamber 1.

The other smaller vessel 23 is the automatic valve container and is situated besides the condenser vessel 15 to which it is directly connected at the bottom and at the top by two short lengths of tube 24 and 25. The automatic valve 26 may alternatively be incorporated in the condenser vessel 15 to which it is connected, but it is better protected in its own container 23.

The whole arrangement is such that a relatively large central portion of the interior of the chamber is reserved for the assembly 14 for pre-freezing and subsequent drying with heating means 14a, thermostats, thermocouples or any other temperature sensing devices and other accessories.

The condenser vessels 15, 16 have hinged or removable circular lids 27, 28 provided with seal gaskets 29 and relief valves 30, 31 similar to those commonly used for motor car radiators. By means of knurled screws 32 in their peripheries these lids 27, 28 can seal the condenser vessels 15, 16 and maintain a certain internal pressure above atmospheric, determined by the setting of the corresponding relief valves 30, 31. The relief valve 30 of the condenser vessel 15 directly connected to the automatic valve container 23 is set to open at a higher differential pressure than the valve 31 of the other condenser vessel 16. Flexible gas outlet pipes 33 and 34 are fitted to the bodies of the relief valves 30 and 31, the relief valve also fulfills the function of overflow pipe.

The automatic valve container 23 has also a removable circular lid 35 with its corresponding seal gasket 36 and peripheral screws 37 (see FIGURE 6), which seal the container 23 to withstand the same super-atmospheric pressures as the condenser vessel 15 to which the container 23 is directly connected.

The pre-freezing-cum-drying assembly 14 is profusely transversed by the double cooling coil 38 which consists of two tubes 39, 40 running together along their full length through the pre-freezing assembly 14 and connected to each other at their common lowest point 41. At the top of the assembly 14 the tubes 39 and 40 separate and go through the wall respectively into the condenser vessels 15 and 16. The tubes 39 and 40 continue down to the lower ends 42 and 43 of the vessels 15 and 16 respectively with their ends at 44 and 45.

Vent valves 46 and 47, each consisting of a transversely drilled body 48 into which a plug piece 49 screws, are fitted respectively at the highest point of the tubes 39 and 40 inside each of the condenser vessels 15 and 16. There is a seal gasket 50 (see FIGURE 6) between each plug piece 49 and its seating 51. The plug pieces 49 each have a vertically flattened top 52 for handling.

A crate 54 is provided in each of the condenser vessels 15 and 16 to facilitate the introduction of large pieces 53 of solid carbon dioxide, where this substance is used. The crates 54 each consist of a flat circular plate 55 attached to two vertical rods 56 at opposed locations. The upper ends of the rods 56 are joined together to form a semi-circular handle 57. The circular flat plates 55 normally rest on the botttom 42 and 43 of the condenser vessels 15 and 16.

The automatic valve 26 consists of a flat annular ring fixed externally and coaxially to a sealed tube 58 (best shown in FIGURE 6) which is kept in the vertical position by a short tubular guide 59 attached centrally and perpendicularly to the bottom 60 of the valve container 23, and by a similar open tube 61 attached perpendicularly and coaxially to the flat circular lid 35 of the valve container 23. The bottom rim 62 of this tube 61 which protrudes below the lid 35 of the valve container 23, is conically shaped internally to form the seating of the valve 26, and its top rim 63 forms the valve exhaust which conveniently protrudes above the said lip 35 for the removable connection of a flexible gas outlet pipe, not shown, to take the outlet gas issuing from the automatic valve while protecting the relevant working surfaces from ice condensed from the water vapour present in the atmosphere. Between the valve 26 and its seating 62 there is a suitable sealing gasket 64 in the form of a washer resting on the valve piece proper 26.

Between the tubular stem 58 and the container 23 there is a freely movable annular floater 65 consisting of two concentric cylinders joined at their top and bottom ends by the appropriate annular rings 66 and 67. The bottom annular ring 67 is heavier than the top one 66 to bring the centre of gravity of the whole floater 65 below its metacentre for the usual liquid refrigerants, so as to provide stability and hence minimal friction.

Below the floater 65, at the lower part of the tubular stem 58 there is an annular resting platform 68 for the floater 65. The platform 68 is supported by a collar piece 69 which is clamped on to the tubular stem 58 by means of a security hose clip 70. The position of this resting platform 68 along the valve stem 58 can be adjusted for height to suit the liquid refrigerant requirements of the pre-freezing assembly 14.

At the top of the valve stem 58 there is a receptacle 71 formed by the top end of the tube 58 and its recessed circular top seal 72. This receptacle 71 may be used to hold small weights 73 added for the final calibration of the valve and/or to compensate for any possible variation in the specific gravity of different liquid refrigerants used on different occasions. At the rim of this receptacle 71 there is a cross rod 74 which finishes flush with the external cylindrical surface of the valve stem 58.

The valve stem 58 with its attachments can be displaced vertically for a short distance. In the up position, as the valve sealing gasket 64 presses against the valve seating 62, the valve is closed. In the down position the valve stem 58 rests on the bottom 60 of the valve container 23 and the valve is open.

The floater 65 can also be displaced vertically through a longer range than that of the tubular stem 58 and its attachments. The floater 65 moves with the tubular stem 58 as a guide, independently of it except at both extremes of its longer displacement when they move together. The free floater 65 and the tubular valve stem 58 constitute the only two moving parts of the automatic valve.

At any moment during the pre-freezing period the position of the automatic valve 26 can be assessed either by direct inspection of the top of the valve stem 58—after temporary removal of the flexible outlet pipe (if not transparent), not shown—or by noticing the periodic release of gas when the valve opens.

The automatic valve 26 can be kept indefinitely in the closed position by using a flexible wire support 74a (see FIGURE 3) the top end 75 of which hooks under the cross rod 74 at the top of the valve stem 58 while its bottom open ends 76 rest on top of the circular lid 35 of the valve container 23. This wire support 74a is normally used in conjunction with the flexible emptying line device shown in FIGURE 5.

The flexible emptying line device consists of a length of flexible pipe 77 the free end of which, not shown, is introduced into an overflow container, also not shown, and the other end 78 is connected on to the top end 79 of a rigid tube 80 which passes freely through an alternative cap 81 for the relief valve 30 and is perpendicular and centrally fitted to its valve piece 82 which is connected to the cap 81 by a spring 83. The bottom end 84 of the rigid tube 80 is connected to one end 85 of a shorter piece 86 of flexible pipe. The other end 87 of this short length 86 of flexible pipe is connected to an end piece 88 which consists of an externally screw threaded tube that can replace the screwed plug piece 49 of the vent valve 46 inside the condenser vessel 15. The relief valves 30 and 31 have removable cap valves 89 and 90 respectively.

The method by which the apparatus operates is as follows: The substance under process, which can be any substance suitable for freeze-drying: solid, semi-solid or liquid, organic or inorganic, is loaded on to the appropriate assembly 14 for pre-freezing and drying inside the cylindrical chamber 1, the temperature sensing devices placed in position and the chamber door, not shown, closed.

Both relief valve caps 89, 90 are removed from their corresponding relief valves 30 and 31 and the lids 27 and 28 of both condenser vessels 15 and 16 opened. The vent valve 47 inside the condenser vessel 16 is closed and the vent valve 46 inside the other condenser vessel 15 is opened.

Any of the usual liquified gases can be used as liquid refrigerant 91 or alternatively a suitable liquid refrigerant cooled by direct contact with subliming solid carbon dioxide 53 may be used.

Where solid carbon dioxide 53 is used there is no need to adopt the laborious practice of breaking it into small pieces, in fact, it is desirable that the pieces should be large, so that: (a) more compact loading can be obtained; (b) no small pieces lying about which might be carried by the liquid refrigerant 91 and temporarily block pipes 24, 25, 39, 40 or interfere with the proper operation of the two moving parts 58 and 65 of the automatic valve; (c) less exposed surface area and shorter time of exposure to collect undesirable water vapour when in contact with the atmosphere; (d) milder physical reaction at first contact with the liquid refrigerant 91 which initially is normally at room temperature; and (e) no physical effort involved in breaking it. Hence whole blocks of solid carbon dioxide 53, if possible, should be used, lowering them into the condenser vessels 15 and 16 by the crates 54 provided in them. The amount of solid carbon dioxide 53 introduced into each condenser vessel 15 and 16 should be approximately the same and the total quantity used at least sufficient to complete pre-freezing without further reloading.

Now, whether solid carbon dioxide 53 is used or not, liquid refrigerant 91 is poured into both condenser vessels 15 and 16 up to similarly positioned level marks (not shown) provided in them. To accomplish this, it may be necessary to pour in the liquid in stages; letting the initial fierce bubbling and violent gas evolution subside before adding more liquid refrigerant 91 to both condenser vessels 15 and 16.

Of course, as the solid carbon dioxide 53 sublimes or as the liquid refrigerant 91 boils off, whichever is the case, the level of liquid refrigerant 91 in the cooling system drops continuously; but there is a considerable range through which the liquid refrigerant level can drop without affecting the automatic operation of the valve 26. In fact, at any moment during the pre-freezing period the proper functioning of the automatic valve and the amount of liquid refrigerant 91 which passes alternately from one condenser vessel 15 and 16 to the other 16, 15, are not affected by the drop in the level of liquid refrigerant 91, provided there is enough of it left in the cooling system completely to fill the condenser vessel 15, the automatic valve container 23 and the double cooling coil 38.

On the other hand if excessive liquid refrigerant 91 is put into the cooling system, the excess is automtaically rejected at the commencement of pre-freezing through the relief valves and their relief and overflow pipes.

Both the lid 28 of the condenser vessel 16 and its corresponding relief valve cap 90 are secured in the closed position. The pressure exerted by the gases collected above the liquid refrigerant level in the condenser vessel 16 will cause the transfer of liquid refrigerant 91 from this said condenser vessel 16 to the other condenser vessel 15 through the double cooling coil 38.

When the rising level of the liquid refrigerant 91 in the condenser vessel 15 reaches the body 48 of the vent valve 46, this valve 46 is subsequently closed and the relief valve 31 on the lid 28 of the other condenser vessel 16 uncapped promptly. This double operation performed in the prescribed sequence ensures both that no air is entrapped in this part 39 of the double cooling coil 38 and that the liquid refrigerant 91 in the condenser vessel 15 does not overflow.

Now the lid 28 of the condenser vessel 16 is opened to gain access to the vent valve 47 which is subsequently opened. The lids 27, 28 of both condenser vessels 15, 16 and their corresponding relief valve caps 89 and 90 are secured in the closed position. At this stage the automatic valve 26 is also in the closed position. Eventually liquid refrigerant 91 will be syphoned from the condenser vessel 15 to the condenser vessel 16 through the double cooling coil 38. Directly the automatic valve 26 opens, the relief valve 31 and the lid 28 are opened. If the level 93 of the liquid refrigerant 91 in the condenser vessel 16 has reached the body of the vent valve 47, this valve 47 is closed. On the other hand if the level 93 of the liquid refrigerant 91 has not reached the body of the vent valve 47, more liquid refrigerant is added to bring that level 93 to the said vent valve 47, which is subsequently closed. If as mentioned before there is an excess of liquid refrigerant 91 in the cooling system, the excess is automatically expelled through the overflow pipe 34 prior to the opening of the automatic valve 26.

After closing the vent valve 47, the lid 28 of the condenser vessel 16 and both relief valve caps 89 and 90 are secured in the closed position and the cooling system commences its automatic operation.

When using one of the common liquid gases as liquid refrigerant 91 it is scarcely necessary to take any special precautions to displace any entrapped air in the double cooling coil 38 since at any moment during the pre-freezing period the said double cooling coil 38 will contain substantial amounts of boiled off gas. In this case the preparation of the cooling system for pre-freezing of the substance under process can be simplified considerably in the following way: Once the substance under process is loaded in the chamber 1 and the chamber door, not shown, closed, both relief valves 30 and 31 are uncapped and the lids 27 and 28 of both condenser vessels 15 and 16 opened; the vent valves 46 and 47 are closed; then solid carbon dioxide 53, where this substance is used, is lowered into both condenser vessels 15 and 16 by means of the crates 54, and liquid refrigerant 91 is poured into both condenser vessels 15 and 16 up to the level marks, not shown, provided; the lids 27 and 28 of both condenser vessels 15 and 16 and both relief valve caps 89 and 90 are secured in the closed position.

This simplified version may be adopted even where solid carbon dioxide 53 is used to cool the liquid refrigerant 91 if there is no objection to the possibility of small amounts of entrapped air remaining at high points in the double cooling coil 38.

The automatic operation of the cooling system for pre-freezing of the substance under process is as follows:

Starting with the automatic valve 26 in the open position, the pressure of the gases above the liquid refrigerant level 92 in the condenser vessel 15 and valve container 23 is approximately atmospheric. On the other hand, as in the other condenser vessel 16 there is no direct communication with atmosphere except through the relief valve 31, which opens only when the internal pressure exceeds the external atmospheric pressure by an adequate valve—two or three pounds per square inch should be sufficient in most cases—the pressure exerted by the gases collected above the level 93 of the liquid refrigerant 91 in this condenser vessel 16 will cause liquid refrigerant 91 to be transferred from the said condenser vessel 16 to the condenser vessel 15 through the double cooling coil 38. As the common level 92 of the liquid refrigerant 91 in the condenser vessel 15 and in the valve container 23 rises, the free floater 65 in the said valve container 23 rises as well until its top surface 66 makes contact with the under surface of the valve piece proper 26. As the said common level 92 of the liquid refrigerant 91 continues rising, eventually, the floater 65 will rise with it again—a larger part of its body submerged—lifting with it the valve 26, valve stem 58 and attachments which, by now, due to the increased amount of liquid refrigerant 91 displaced by the tubular stem 58 are nearly floating by themselves, until the sealing washer 64 on the valve 26 makes contact with the seating of the valve 62. The floater 65, the valve 26 and the valve stem 58 with attachments stop, although the level 92 of the liquid refrigerant 91 which supports them continues rising for a while increasing the pressure between the valve piece 26, the sealing washer 64 and the valve seating 62, causing the valve to close. When the pressure of the small volume of gases entrapped above the level 92 of the liquid refrigerant 91 in the condenser vessel 15 and in the valve container 23 approaches the pressure of the gases above the level 93 of the liquid refrigerant 91 in the condenser vessel 16 the said level 92 of the liquid refrigerant 91 in the condenser vessel 15 and in the valve container 23 stops rising.

The internal pressure required to open the relief valve 30 against the external atmospheric pressure is greater than that required to open the other relief valve 31 by an adequate value—again a pressure differential of two or three pounds per square inch between both relief valves 30 and 31 should be enough in most cases. Therefore as the approximately equal pressure of the accumulated gases above the liquid levels 92, 93 in both condenser vessels 15 and 16 and valve container 23 increases, eventually it will reach a value such that the relief valve 31 on the lid 28 of the condenser vessel 16 will open releasing some of the accumulated gases in the said condenser vessel 16 keeping subsequently a nearly constant maximum internal pressure of the remaining collected gases, not greater than the setting of the said relief valve 31.

The pressure of the accumulated gases above the liquid level 92 in the condenser vessel 15 and valve container 23 will increase above the setting pressure of the relief valve 31 on the lid 28 of the condenser vessel 16, therefore liquid refrigerant 91 will flow from the condenser vessel 15 to the condenser vessel 16 through the double cooling coil 38. As the level 93 of the liquid refrigerant 91 in the condenser vessel 16 rises that in the condenser vessel 15 and in the valve container 23 falls carrying with it the floater 65 until the floater 65 reaches its resting platform 68. During the previous period the valve 26 remains closed under the following balanced forces: (i) buoyancy due to the liquid refrigerant 91 displaced by that part of the valve stem 58 and accessories which still remain submerged; (ii) internal super-atmospheric pressure of the gas acting on the effective surface area of the valve 26; (iii) external atmospheric pressure acting on the same effective surface area as that on which the previous force (ii) is acting (although in the opposite direction); (iv) weight of valve 26, valve stem 58 and attachment; and (v) normal reaction of the seating 62 of the valve 26 acting against the valve 26 or valve sealing washer 64. Forces (i) and (v) decrease continuously by approximately the same amount. The required condition is that force (v) should not vanish until the free floater 65 in its descent reaches the resting platform 68. This requisite can easily be fulfilled since all five forces mentioned above can be controlled and modified accordingly at some stage in the design of the apparatus. Furthermore, even for a finished apparatus, force (iv) can be adjusted by adding or removing, as applies, some small weights 73 in the receptacle 71 at the top of the tubular valve stem 58 for final calibration of the valve and/or to suit liquid refrigerants of different specific gravity which would alter force (i) at all liquid levels.

When the descent of the free floater 65 is arrested by its resting platform 68 a new downward rapidly increasing force (vi) starts to act upon the valve 26 i.e. that part of the weight of the free floater 65 no longer supported by the liquid refrigerant 91. Eventually this downward increasing force (vi) in combination with the decreasing upward force (i) will cause force (v) to vanish, and the valve 26, valve stem 58, attachments and floater 65 will all fall down opening the valve. As soon as the valve is opened some of the accumulated gases in the condenser vessel 15 and valve container 23 will escape through the annular gap between the top guide piece 61 and the tubular valve stem 58, and the pressure of the remaining gases will become practically atmospheric, i.e. force (ii) has been suddenly and radically reduced, and the valve stem 58 and attachments will rest on the bottom 60 of the valve container 23.

But the quasi static pressure of the accumulated gases in the condenser vessel 16 remains super-atmospheric, hence the cycle starts again.

In brief, the cyclic operation of the automatic valve can be described as follows: (a) When the liquid 91 in the valve container 23 reaches its high level point, the valve 26 closes. (b) When the level 92 is dropping the valve 26 remains closed. (c) When the liquid 91 reaches its low level point, the valve 26 opens. (d) When the said level 92 is rising the valve 26 remains open.

The volume of liquid refrigerant 91 involved in this alternating displacement depends on the capacity between the high and low levels of the liquid refrigerant 91 in the condenser vessel 15 and in the valve container 23. This capacity can be adjusted by varying the position in height of the supporting platform 68 for the free floater 65, and should not be less than the internal volume of the double cooling coil 38 so that the liquid refrigerant inside the said double cooling coil 38 has a chance to be renewed at each displacement.

Should it be necessary to gain access to the inside of either condenser vessel 15 and 16 or valve container 23 during the pre-freezing period for topping up with liquid refrigerant 91 and/or solid carbon dioxide 53, or for any other reason, the reciprocating automatic transfer of liquid refrigerant 91 between both condenser vessels 15 and 16 can be stopped at any moment by uncapping the relief valve 31. During the pre-freezing period no attempt should be made to open any condenser vessel lid 27 and 28 without first removing its corresponding relief valve cap 89 and 90 and the relief valve cap 89 should not be open unless the condenser vessel 16 is open or its corresponding relief valve cap 90 has been removed.

Where solid carbon dioxide 53 is used to cool the liquid refrigerant 91, the said liquid refrigerant 91 flowing through the double cooling coil 38 extracts heat from the tubes 39 and 40 and hence warms up gradually as it flows. The further the liquid refrigerant is from its source or inlet measured along its path the warmer it becomes. Also, other conditions remaining unchanged, the heat extraction capacity of a given flow of liquid refrigerant depends on its temperature, i.e. on its distance from the inlet measured along its path. At any point along the length of double cooling coil 38 and at any moment when the liquid refrigerant is flowing through one of the tubes 39, 40 in one direction, it is flowing also through the other tube 40, 39 in the opposite direction. The total distance from the prevailing liquid refrigerant inlet 44, 45 of any point on the double cooling coil 38 measured along the direction of flow separately for the two tubes 39 and 40 forming the double cooling coil 38 and then added up together is a constant value for all points on the said double cooling coil 38. This condition tends to provide a uniform heat extraction per unit length of double coil 38 all along its length. This effect is enhanced considerably by the additional, periodic reversion of flow and counterflow.

Where the liquid refrigerant 91 is one of the usual liquid gases there will be a mixture of the liquid and gas phases flowing through the tubes 39 and 40 forming the double cooling coil 38. This mixture will be the richer in its liquid component the nearer it is to the prevailing liquid refrigerant inlet 44 and 45 and therefore, in this case also, both the disposition of the double cooling coil 38 and the periodic reversion of flow and counterflow of the liquid refrigerant will promote the desirable uniformity of heat extraction all along the length of the said double cooling coil 38.

In most cases, once the cooling system has been initially supplied with the right amounts of liquid refrigerant 91 and solid carbon dioxide 53, where this substance is used, there will be no need for further intervention until pre-freezing of the substance under process is completed.

The rise in the temperature of sublimation of the solid carbon dioxide 53 or in the boiling point of the liquid gas used as liquid refrigerant 91, as applies, arising from the super-atmospheric pressures prevalent in the cooling system during the pre-freezing period are relatively small and their effects negligible.

At the end of the pre-freezing period the chamber 1 is evacuated to a suitable sub-atmospheric pressure by a vacuum pump, not shown, and the flow of liquid refrigerant through the double cooling coil 38 is stopped by uncapping both relief valves 31 and 30 as described above.

The lids 27 and 28 of both condenser vessels 15 and 16 are opened and both vent valves 46 and 47 are opened as well.

At this stage it is not normally necessary to take any action to empty the double cooling coil 38 of liquid refrigerant, but if so desired it can easily be done by temporarily resealing the condenser vessel 16 with its lid 28 and relief valve cap 90.

Now, or at any convenient time during the subsequent drying period more liquid refrigerant 91 and/or more solid carbon dioxide is added to one or both condenser vessels 15, 16 if so required.

The lids 27 and 28 of the condenser vessels 15 and 16 are closed but the relief valves 30 and 31 should be left uncapped and the vent valves 46 and 47 opened.

Heat is applied to the frozen substance by the drying assembly 14 and the water vapour coming from the ice in the said frozen substance will condense in the form of ice on the convex cylindrical wall and circular base of the condenser vessels 15 and 16 and valve container 23.

At the end of the drying period the heating means are turned off and the vacuum pump, not shown, is stopped or isolated from the chamber 1 by the isolation valve 20 while air or an inert gas at atmospheric pressure is admitted into the said chamber 1 through the gas or air inlet valve 18 which is interchangeable with the pressure gauge head 19. The chamber door, not shown, is opened and the dried substance unloaded.

If, at the end of the drying period after unloading the dried substance, it is decided to empty the cooling system of liquid refrigerant 91 and/or solid carbon dioxide 53 for the purpose of accelerating defrosting of the condenser vessels 15 and 16 and valve container 23, or at any other time for any other reason, the procedure is as follows:

After removal of the lids 27 and 28 of both condenser vessels 15 and 16 the plug piece 49 of the vent valve 46 is removed and replaced by the screwed end piece connection 88 at one end of the flexible emptying line FIGURE 5. Before this connection 88 is screwed into the body 48 of the vent valve 46, it must be passed through the uncapped relief valve 30 on the lid 27 of the condenser vessel 15. When the flexible emptying line FIGURE 5 has been connected to the vent valve body 48 the condenser vessel lid 27 is secured in the closed position. The relief valve 30 on this lid 27 is capped with the cap 81 provided on the flexible emptying line FIGURE 5 after easing in the short length 86 of the said flexible emptying line FIGURE 5, making sure there are no kinks in it which might restrict the subsequent outflow of the liquid refrigerant 91.

The free end of the flexible emptying line is placed into the overflow container, not shown, or into any other suitable vessel.

The vent valve 47 in the other condenser vessel 16 is closed and the lid 28, with its corresponding relief valve 31 uncapped, is secured in the closed position.

Now the cooling system is ready to be emptied of liquid refrigerant 91 and the internal pressure of the gases in both condenser vessels 15 and 16 is atmospheric as both are in direct communication with the atmosphere.

Removal of the flexible pipe, not shown, connected to the automatic valve exhaust 63 will give access to the top of the tubular valve stem 58 which is raised by holding the rod 74 fitted to its rim. The valve 26 is maintained in the raised (closed) position by means of the flexible wire support FIGURE 3, the top end 75 of which hooks under the rod 74 while its bottom open ends 76 rest on the lid 35 of the valve container 23. Directly this has been done the relief valve 31 is capped. Now the pressure of the gases accumulated in both condenser vessels 15 and 16 will be super-atmospheric and as the free end of the flexible emptying line is at atmospheric pressure, the liquid refrigerant 90 in both condenser vessels 15 and 16 will be syphoned out through it. If during this operation it is required to stop the outflow of the liquid refrigerant 91, the relief valve 31 and the automatic valve 26 are opened.

The remaining solid carbon dioxide 53, where this substance is used, is extracted by using the crates 54.

The melting ice produced by the defrosting of the condenser vessels 15 and 16 and valve container 23 can be collected in individual trays, not shown, placed at the bottom of the cylindrical chamber 1 underneath the said condenser vessels 15 and 16 and valve container 23 for later disposal, or simply in a suitable tray, not shown, placed underneath the frame of the door 4 of the open chamber 1.

The relief valves 30 and 31 besides their normal function as an integral part of the automatic cooling system provide a double safety device for the super-atmospheric pressure encountered in the said cooling system.

I claim:
1. Apparatus comprising
   (a) a vacuum chamber
   (b) a freezing assembly in said vacuum chamber
   (c) a cooling coil incorporated in said freezing assembly
   (d) substance supporting means also incorporated in said freezing assembly; and
   (e) flow means for effecting periodic and automatic reversion of flow and counterflow of refrigerant through the said cooling coil.
2. Apparatus as claimed in claim 1 in which the vacuum chamber is cylindrical in shape.
3. Apparatus as claimed in claim 2 in which the vacuum chamber has an opening formed by the removal of a full length cylindrical segment of the cylindrical chamber.
4. Apparatus as claimed in claim 1 further comprising means for heating the freezing assembly after substances to be processed are frozen thereby.
5. Apparatus comprising
   (a) a vacuum chamber
   (b) a freezing assembly in said vacuum chamber
   (c) a cooling coil incorporated in said freezing assembly
   (d) substance supporting means also incorporated in said freezing assembly
   (e) first and second gas tight compartments in which the ends of the cooling coil are respectively received
   (f) liquid refrigerant in the compartments, the ends of the cooling coil being located below the level of said liquid refrigerant
   (g) first and second relief valves connected to the first and second compartments respectively above the level of said liquid refrigerant, the said first relief valve operating at a higher pressure than the second relief valve, and
   (h) relief means for periodically relieving the pressure in the first compartment above the level of the liquid refrigerant.
6. Apparatus as claimed in claim 5 in which the relief means comprises:
   (a) a float responsive to the level of liquid refrigerant in the first compartment, and
   (b) a valve connected to be opened by the float when the level of liquid refrigerant in the first compartment falls below a predetermined level.
7. Apparatus as claimed in claim 6 in which the float is connected to the valve to close the latter when the level of refrigerant in the first compartment rises above a predetermined level.
8. Apparatus as claimed in claim 6 in which the relief means is housed in a separate compartment connected at its upper and lower ends to the said first compartment.
9. Apparatus as claimed in claim 5 comprising:
   (a) a normally closed port at a high point of the cooling coil,
   (b) pipe means connectable to the said port when open and leading to a receiver, and
   (c) means for closing the relief means.

(References on following page)

References Cited

UNITED STATES PATENTS

| | | | |
|---|---|---|---|
| 1,893,228 | 1/1933 | Copeman | 62—167 |
| 2,176,289 | 10/1939 | Beebe | 62—167 |
| 2,760,345 | 8/1956 | Woods | 62—165 |
| 3,132,929 | 5/1964 | Thuse | 34—5 |
| 3,172,271 | 3/1965 | Dubois | 62—168 |
| 3,233,333 | 2/1966 | Oppenheimer | 34—5 |
| 3,253,348 | 5/1966 | Oderman | 34—92 |

WILLIAM J. WYE, *Primary Examiner.*